United States Patent
Kemmerer, Jr. et al.

(10) Patent No.: US 9,648,467 B2
(45) Date of Patent: May 9, 2017

(54) GROUP COMMUNICATION CONFIGURATION

(71) Applicant: GENBAND US LLC, Frisco, TX (US)

(72) Inventors: Frederick C. Kemmerer, Jr., Hollis, NH (US); Carroll L. Gray-Preston, Morrisville, NC (US)

(73) Assignee: Genband US LLC, Plano, TX (US)

( * ) Notice: Subject to any disclaimer, the term of this patent is extended or adjusted under 35 U.S.C. 154(b) by 154 days.

(21) Appl. No.: 14/168,943

(22) Filed: Jan. 30, 2014

(65) Prior Publication Data

US 2015/0215747 A1   Jul. 30, 2015

(51) Int. Cl.
*H04W 4/08* (2009.01)
*H04W 4/00* (2009.01)

(52) U.S. Cl.
CPC ............. *H04W 4/08* (2013.01); *H04W 4/001* (2013.01)

(58) Field of Classification Search
CPC ......... H04W 4/08; H04W 4/001; H04W 4/12; H04W 4/16
See application file for complete search history.

(56) References Cited

U.S. PATENT DOCUMENTS

| | | | |
|---|---|---|---|
| 2007/0036118 A1 | 2/2007 | Shaffer et al. | |
| 2008/0077518 A1* | 3/2008 | Boglaev | G06Q 40/04 705/36 R |
| 2010/0008650 A1* | 1/2010 | Bull | H04N 21/4126 386/200 |
| 2010/0185787 A1* | 7/2010 | Krantz | H04L 12/1818 710/19 |
| 2012/0115494 A1 | 5/2012 | Christensen et al. | |
| 2014/0187196 A1* | 7/2014 | Okatake | H04W 16/18 455/405 |
| 2015/0134722 A1* | 5/2015 | Marshall | H04L 67/42 709/203 |
| 2015/0319223 A1* | 11/2015 | Deepak Narayana | H04L 67/10 709/206 |

FOREIGN PATENT DOCUMENTS

EP          1037025          6/2008

OTHER PUBLICATIONS

EPO; Extended EP Search Report, Application No. 15153331.2-1870, dated Jun. 22, 2015, 6 pgs.

* cited by examiner

*Primary Examiner* — Bobbak Safaipour
(74) *Attorney, Agent, or Firm* — Haynes and Boone, LLP

(57) ABSTRACT

A method includes generating, by a computing system, configuration information for configuring a communication application, the configuration information based at least in part on usage information associated with communication application configurations specific to a group comprising a plurality of users. The method further includes determining that a first user within the group is using the communication application for communicating via a client device with at least one other user in the group and responsive to the determining, sending the configuration information to the client device.

20 Claims, 8 Drawing Sheets

GROUP COMMUNICATION CONFIGURATION

BACKGROUND

The present disclosure relates generally to communication configuration, and more particularly to methods and systems for handling of group communication configurations.

Communications become increasingly mobile. Users may communicate through mobile devices such as smartphones and tablet devices. Users may also bring their laptop computers to various locations and connect to various networks in order to communicate from those locations. Additionally, users often communicate in various contexts using different communication methods. For example, users may communicate for work projects using web collaboration applications, email applications, and other applications suitable for a professional environment. Users may communicate with friends and family using other types of applications such as instant messaging, voice calls, or video conferencing.

In some cases, a user may use a single application for communicating in different contexts. For example, a user may use a video conference application for work but share only slides through the video display. The user may share video as captured by a webcam when using the application for communication with friends or family. Even within the same context, users may use different settings for various communication applications. For example, within the work context, users may use different communication application settings for different projects.

Because a user may regularly use different settings for different scenarios, a user often has to manually reconfigure the settings of the various communication applications used by the user. This can have an adverse effect on productivity. Additionally, this may be a source of frustration for a user. Thus, it is desirable to provide methods and systems that provide a better user experience for various communication applications.

SUMMARY

According to one example, a method includes generating, by a computing system, configuration information for configuring a communication application, the configuration information based at least in part on usage information associated with communication application configurations specific to a group comprising a plurality of users. The method further includes determining that a first user within the group is using the communication application for communicating via a client device with at least one other user in the group and responsive to the determining, sending the configuration information to the client device.

According to one example, a computing system includes a processor and a memory comprising machine readable instructions that when executed by the processor, cause the system to maintain group communication records for a group including a plurality of users, maintain user communication records for each of the plurality of users, analyze the group communication records and the user communication records to generate preferred communication application configurations for each of the plurality of users, determine that an interaction between the plurality of users within the group is to occur, and instruct communication applications on client devices of the plurality of users within the group to adopt the preferred communication application configuration for the plurality of users.

According to one example, a method for group collaboration communication configuration includes, with a server system, receiving usage information associated with interactions of a group, and maintaining a group communication record for the group, the group communication record being associated with a set of user communication records for each user within the group, the user communication records associated with communication application settings of users when interacting with the group, the group communication records being specific to the group and being different from the set of user communication records. The method further includes, in real time, determining that a new interaction of the group is to occur, detecting a client device used by a first user of the group for the new interaction, and configuring settings of the client device based on the user communication records for the first user, the settings based on a best match based on historical user settings for interactions of the group stored in the user communications records for the first user.

BRIEF DESCRIPTION OF THE DRAWINGS

Aspects of the present disclosure are best understood from the following detailed description when read with the accompanying figures.

Figure 1A:
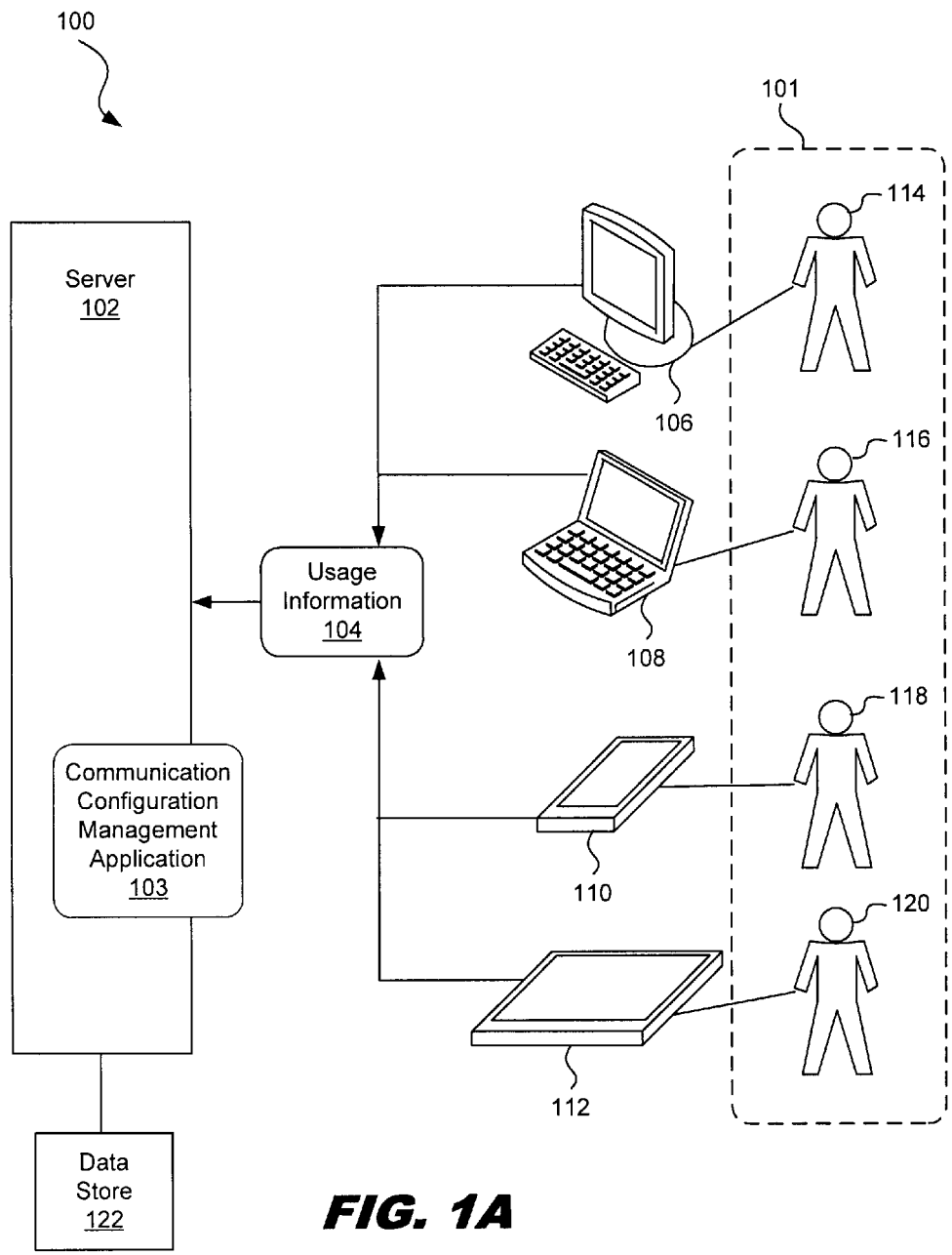
FIG. 1A is a diagram showing an illustrative process for collecting usage information from users within a group, according to one example of principles described herein.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, a user of conventional systems often has to manually reconfigure the settings of the various communication applications used. For example, when a group of users hold regularly scheduled conference calls and make use of web collaboration tools, they go through multiple steps to set up the communication sessions. First the users need to dial into the conference bridge and provide the required login credentials. Then they login to the web collaboration tool, providing the appropriate credentials again. This can have an adverse effect on productivity. Additionally, this may be a source of frustration for a user. This experience can be improved by having the system detect that for such regularly scheduled events, both voice and web collaboration are typically used and the system could automatically configure the communication sessions for the group of users.

According to principles described herein, user communications within a specific group can be monitored. For example, when particular individuals interact with the specific group, they may prefer certain settings. One user may typically interact with the group through his or her smart phone, and may communicate through voice only. Another user may interact with the group through his or her laptop computer using a web collaboration application. That user may wish to position the web collaboration windows in a particular manner when working with the specific group.

The usage information based on how the group interacts can be collected, maintained, and analyzed to provide preferred communication configuration information. Specifically, usage information related to what communication modes users use in a given group situation is collected. That usage information is leveraged by the system to form preferred communication configuration information. The preferred communication configuration information defines how each user of the group prefers to interact with other members of the group. In some cases, the preferred communication information defines how users interact with subgroups within a group. For example, one subgroup may be supervisors and another subgroup may be peers. Thus, when the group interacts in a subsequent communication session, the configuration information can be sent to the devices used by the users for the session. The configuration information then configures the devices and communication sessions based on how the users prefer to interact with the group.

The preferred communication configuration information can be determined through a variety of different ways using information from a variety of different sources. In one case, the preferred communication configuration information may be determined based on the most common settings used by the user during communication with the group. For example, if a user usually mutes his or her microphone when participating in group meetings, then that user's device will automatically mute the microphone when the user interacts with that group. The user's device knows to do this based on the received preferred communication configuration information. Communication configuration information may define a number of other settings including, but not limited to, application window positioning, camera settings, speaker settings, preferred conversation type (chat, call, screen share, video conference), and display settings.

The data related to preferred communication configurations can be collected and stored in a variety of ways. For example, applications that run on the devices themselves may collect information and determine preferred communication configurations. In some cases, the server may do most of the collecting. As will be described in further detail below, both the server and the devices themselves may execute the implementation of preferred communication configurations in a variety of different ways. Specifically, implementation of the preferred communication settings may be distributed between a client and a server.

In some examples, a user's preferred communication configuration may depend on the device from which the user is interacting with the group. This information can affect how the user's device for the current session is automatically set. For example, if the user is on a collaborative call on the user's mobile phone, a first set of window arrangements might be presented (or none at all, and allow for voice interaction only), whereas a collaborative call on the user's laptop computer might result in a different configuration (e.g., different arrangement of windows, etc.) based on the "learned" preferences of the user. By contrast, when the user is on a collaborative call on his/her tablet device, the entire screen would be utilized when content is being displayed on the collaboration session.

In some examples, the user's preferred settings may not be available based on the current state of the user's device. Thus, the users preferred settings may be approximated to come as close as possible in light of the circumstances. Various other features may be used to automatically adapt a user's device to specific group settings as will be described in further detail below.

FIG. 1A is a diagram showing an illustrative process for collecting usage information from users 114, 116, 118, 120 within a group. According to the present example, a group 101 of users 114, 116, 118, 120 communicates with each other on a repeating basis. In this example, each of the users 114, 116, 118, 120 communicate using different devices 106, 108, 110, 112. The settings of the devices 106, 108, 110, 112, which in this example includes communication applications running on those devices, for communication with the group 101 may be collected and sent to a server 102 on a continual basis. The collected data will be referred to as usage information 104. The usage information 104 associated with the group 101 is then stored on a data store 122 associated with the server 102.

The group 101 may be formed for a variety of reasons. For example, the group 101 may be made up of employees working for the same entity and collaborating on a specific project. In some examples, the group 101 may be made up of several different people from different entities collaborating on a project. In some cases, the group of people may be made up of friends or family wishing to socialize on occasion.

The group 101 may be formed in a variety of different ways. For example, in an organizational environment such as a business, a group may be set up manually for a specific purpose by a system administrator. In other words, the system administrator may manually set up a group and specify the users 114, 116, 118, 120 of that group. The system administrator may use the communication configuration management application 103 to set up groups as needed or desired.

In some examples, a user may have access to the communication configuration management application 103 so that he or she can manually set up his or her own groups. For example, the user may set up a group for co-workers, a group that is made up of school parents who communicate regularly to arrange school activities, and a group that is made up of that user's family members. The user may have access to the configuration management application 103 through, for example, a web portal.

In some examples, the group 101 may be automatically detected or discovered over time by analyzing user patterns. If a group of people begin to regularly communicate with each other over communication networks, then various pieces of hardware and software within those communication networks can determine that and provide that information to the communication configuration management application 103.

The communication configuration management application 103 may be used to manage groups of users 114, 116, 118, 120 in accordance with principles described herein. The communication configuration management application 103 may include computer readable instructions that are run on the server 102. In some examples, the application 103 may run on a separate system and be in communication with the server 102.

When different users 114, 116, 118, 120 communicate with a specific group 101, they may typically communicate using specific devices 106, 108, 110, 112 using specific settings. In this example, the first user 114 communicates using a desktop computer 106. The second user 116 communicates with a laptop computer 108. The third user 118 communicates with a smartphone device 110. The fourth user 120 communicates using a tablet device 112. The type of devices that may be used in accordance with principles described herein is not limited to the illustrated devices. Other devices may be used such as a desktop telephone capable of receiving configuration instructions over a network.

The users 114, 116, 118, 120 may communicate with each other using a specific communication application (e.g., a conferencing and file sharing application). The communication application may provide a variety of communication services such as web collaboration services, file sharing services, voice over interne protocol (VoIP) services, audio or video conference services, instant messaging services, video chat, or calendar services.

In one example, a user may use several different communication applications at once. For example, the group 101 may use a VoIP application to transmit audio and voice. Additionally, the group may use a web collaboration application to share and review documents together. Furthermore, the group may use an instant messaging application for quick chats in addition to the audio. Each user may have preferred settings for each of these applications when communicating with members of the group 101. These settings may include the screen positioning of each of these applications, color or background settings, and text and font settings. As discussed in further detail below with the text accompanying FIG. 1C, not all members of a group need to be in a session for the group configurations settings to be applied.

In some examples, if a group is determined to be a "trusted" group, like co-workers of a common employer, then the configuration settings may be set to allow for more information about each user to be displayed such as their shared calendars, contact info, etc. By contrast, such information may not be displayed for other groups such as among a group of school kids parents who may communicate to arrange school activities. In other words, based on the nature of the group, various types of information may be automatically shared between group members. For instance, in a trusted group, the user email addresses and telephone numbers, etc. may be shared and visible among the members of that group. But, in a less trusted groups (like among school parents who may only communicate regularly with each other over the course of a single school year), their individual email addresses may be hidden. In some examples, a generic email address (e.g., userA@schoolgroup.com, userB@schoolgroup.com, etc.) may be created and used as a proxy for the group members' true email addresses. That way, when the group ends, each user's personal contact information has not been distributed.

In some examples, a single communication application may offer several different communication services. For example, the single communication application may offer the VoIP, audio, and instant messaging services described above. Each user may have preferred settings for each of these features within the application. For example, the application may allow the user to position the different windows associated with each function as desired.

The various users 114, 116, 118, 120 may have different preferences for how they interact with the group 101. For example, when communicating with the group 101 through a video conference application, the first user may prefer to minimize the window of the video conference application. This may be because the first user typically communicates using the desktop computer 106, which generally has larger screen space available.

To further the example, when communicating with the group 101 using the video conference application, the second user 116 may prefer to maximize the volume settings on the laptop device 108. The third user 118 may prefer to maximize the window of the video conference application due to the small screen space available on the smartphone device 110. The fourth user 120 may prefer to participate in the audio only and not use the camera of the tablet device 112 for the video aspect of the video conference application. Various other preferred device and application settings may be used by each of the users 114, 116, 118, 120 when communicating with the group 101. These preferred device and application settings are specific to the group 101 and may not apply when the users 114, 116, 118, 120 communicate with other people or other groups.

The usage information 104 may include various types of information. In general, the usage information 104 includes the preferred device and application settings for users 114, 116, 118, 120 within the group 101. Specifically, the usage information 104 may indicate the type of device that is regularly used, the capabilities of that device, and the regularly used settings of that device. Additionally, the usage information 104 may include the commonly used settings for applications running on the device.

The usage information 104, which indicates the preferred device and application settings for users 114, 116, 118, 120 within the group 101, may be collected in a variety of ways. In one embodiment, the communication applications running on the user devices 106, 108, 110, 112 may collect the usage information 104 and send it to the server 102. For example, in the case of a web collaboration application used to communicate with the group 101, the web collaboration application itself may collect the user preferences when interacting with the group 101.

In one embodiment, a separate collection application that runs on the user devices 106, 108, 110, 112 may collect the usage information 104. For example, the separate collection application of the devices 106, 108, 110, 112 may collect usage information 104 from the various communication applications running on those devices 106, 108, 110, 112. Specifically, the various device and application settings used when communicating with the group 101 are collected and sent to the server 102, or the communication configuration management application 103.

In one embodiment, usage information 104 may be collected by a server portion of a communication application. For example, a web collaboration application may have a server component as well as the client component running on the user devices 106, 108, 110, 112. The server component may collect the preferred device and usage settings from the user devices 106, 108, 110, 112.

In one embodiment, network equipment within the communication networks that provide communication between the devices 106, 108, 110, 112 may collect the usage information 104. For example, deep packet inspection (DPI) or other packet analyzers may be used to look for specific pieces of data within the packets being transmitted over the network. The packets may include information that indicates the device and application settings as well as with whom a user is communicating. DPI may be performed in any of a variety of places, such as on an enterprise network or within the servers of an Internet Service Provider (ISP).

The usage information may be collected continually in order to adapt to a user's changing preference. For example, a user may choose to use one setting for a period of time, but then learn of a new setting that he or she prefers over the old setting. The continual collection of usage information 104 allows for an updated preferred communication configuration for that user.

In some examples, the usage information 104 may indicate whether a user is an active or a passive participant. Using a video conference example, an active participant is one who transmits audio or video to participate in the discussion. A passive participant is one who merely listens or watches the audio and video but does not respond. Thus, a passive participant may not be transmitting any audio or video data. Rather the passive participant merely receives audio and video data. Determining whether a group participant is active or passive may help determine preferred communication settings.

For example, if a user is regularly a passive participant, then the preferred communication setting may be to mute the microphone. But, on a particular communication session if the user chooses to be an active participant, he or she may manually unmute the microphone and engage in communication. If the user becomes more active over time, then the usage information 104 will indicate as such and the preferred communication settings may no longer include muting the microphone.

Figure 1B:
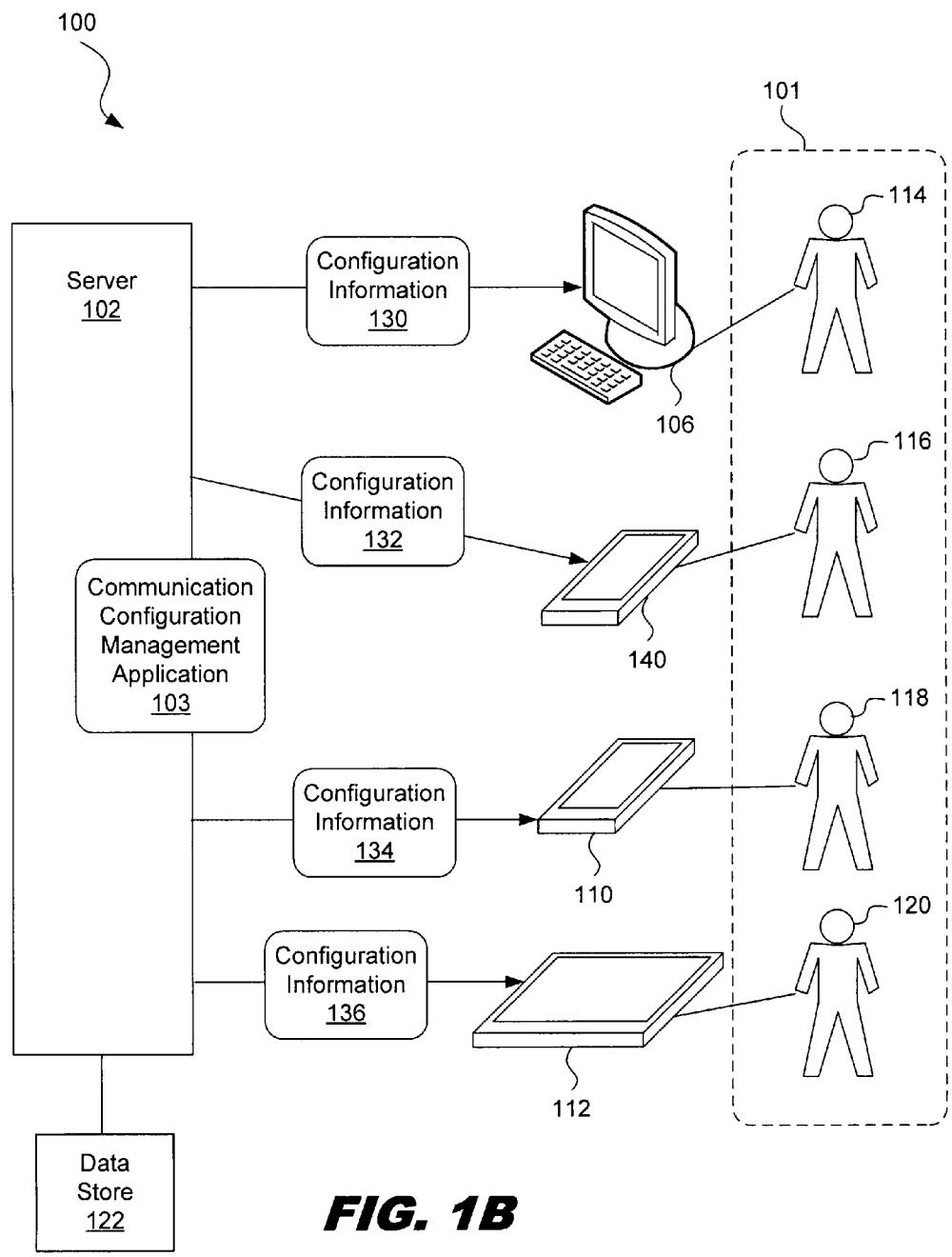
FIG. 1B is a diagram showing an illustrative process for sending configuration information to users within a group, according to one example of principles described herein.

FIG. 1B is a diagram showing an illustrative process for sending configuration information from a server 102 to users 114, 116, 118, 120 within a group. According to the present example, having a set of usage information for user preferences during communication with a specific group, configuration information 130, 132, 134, 136 can be sent to the users 114, 116, 118, 120 within the group 101 in response to determining that the group 101 is interacting with each other. The configuration information 130, 132, 134, 136 is sent to the device of each user individually.

It can be determined that the group 101 is interacting with each other through a variety of methods. In one example, the communication applications used by the group can inform the communication configuration management application 103 that a communication session is beginning or scheduled to begin. In one example, a separate application running on a user device 106 may detect when communication applications are being used to communicate with the group. In one example, DPI may be used to determine when a user is communicating with the group 101 by detecting source and destination addresses, correlating those addresses to group members, and inferring group communications therefrom. Any appropriate method for detection of group communication is within the scope of embodiments.

The configuration information 130 may include instructions for the appropriate communication application of the user device 106 to implement the preferred settings as a default when the user 114 communicates with the group. Thus, the configuration information is specific to a user 114 and the user's device 106. The configuration information 130 may be packaged according to the type of device and type of application that is having its settings changed to the preferred settings for communication with the group 101. In some examples, the user may be presented with the option of accepting the suggested preferred settings or overriding those for the user's manually-set configuration settings on any given occasion. Alternatively, the user may have the option to configure a communication application to always accept the configuration settings from the server.

For example, the configuration information 130 for the first user 114 may set the position of the window(s) for the communication application as preferred. The configuration information 134, 136 for the third user 118 and the fourth user 120 may set the configuration of the communication application(s) used on the devices 110, 112 for those users 118, 120 according to their preferences. But, in this example, the second user 116 is using a different device 140 than is normally used when communicating with the group. The system can be made aware of this based on device identification information such as media access control (MAC) address or other type of device identifier. The server may have access to the user's service profile, which may indicate the device(s) used and capabilities of those devices. The user's service profile may also include types of service(s) used, including voice, video, chat, collaboration, file sharing and others. The service profile may also include data such as the user's use of services, devices and/or usage location and/or context.

When a user 116 communicates with the group 101 through a different device than usual, then the settings of the new device 140 are set as best as possible. For example, some preferred settings may be applicable no matter what device a user is using. For example, muting a microphone may apply to any device that uses a microphone. The server 102 may have the intelligence to determine what kind of settings can be applied across multiple devices. Other preferred settings may be specific to a device. For example, the new device 140 may not have the networking capabilities to stream outgoing video. The server 102 may be able to determine this based on the device identifier. Or, the device 140 may inform the server of its capabilities. In some examples, the device 140 may receive the configuration settings for the old device, but simply not apply those settings because it is not capable of doing so. Thus, the user 116 may have to participate only in the audio aspect of a video conference while omitting the video portion.

This approximation may be done by the user's device. For example, after the device receives the configuration information 130, it will approximate the preferred configuration for the communication application being used to communicate with the group. This approximation is performed if the current state or type of the device 106 is not amenable to one or more aspects of the preferred configuration. As described above, the user may be using a different device with different hardware capabilities.

Alternatively, the user's device 106 may have certain hardware features disabled. For example, the web camera may be disabled. Thus, if the preferred communication configuration is to send video, this is not possible if the camera that obtains that video is not enabled. The approximation process, which may be performed by the device itself, can take into account the hardware states such as a camera state, a microphone state, a speaker state, or a network interface card state, and approximate preferred settings when hardware states are incompatible with one or more aspects of the preferred configuration.

Alternatively, the approximation is performed if the current state of the communication application running on the device is not amenable to the preferred configuration. For example, a video conference application may have a private mode that does not allow video to be sent over the video conference application. Thus, a user provides only audio to the group communication within audio mode. When the application is in private mode (a particular state), then if the preferred communication configuration is to provide video, video may nevertheless be omitted based on an overriding setting such as the private mode of the communication application.

In some examples, the configuration information 130 may include a first preference and a second preference. In one example, a user may use setting A 60% of the time when communicating with the group 101. That same user might use setting B 35% of the time when communicating with the group 101. Thus, setting A can be a first preference and setting B can be a second preference. Thus, if for whatever reason, setting A is not available, the approximation process can use setting B, if setting B is available based on the current state of the user's device and the current state of the communication application on that device.

In some examples, the system may present the user with an easy option to select any of the different configuration settings for a given interaction, rather than requiring the user to go through the traditional configuration "settings" menu. This eases the user's ability to get the desired configuration settings more efficiently. For example, the system may automatically configure a window arrangement that it assumes is most preferred by a user (based on prior interactions). But, the system might know of other window arrangements that have also been used on previous occasions by the use. The system might present the user with an easy option to select one of those other configurations. For example, the system may provide the user with some form of preview of what each of those other configurations look like and allow the user to select any of them with a click of the mouse or other input mechanism.

In some examples, the configuration information may present setting A and setting B and the user may have the option to choose which setting to use. While setting A may be the default setting, as that is the most commonly used setting, the user may wish to use setting B in a particular communication session with the group 101. In some cases, a user may set the communication application to always accept the configuration information received from the server 102.

The computing intelligence used to determine how to apply the preferred communication setting may be implemented in various ways. For example, the intelligence may be located on a server application that has a client/server relationship with an application running on a user's device. In some examples, the intelligence is located on the user devices instead of a server. In some examples, both client and server work together to perform the desired functions. In some examples, various pieces of network equipment within the communication network perform the desired functions. Any appropriate division of intelligence between user devices and network devices may be used in some embodiments.

Figure 1C:
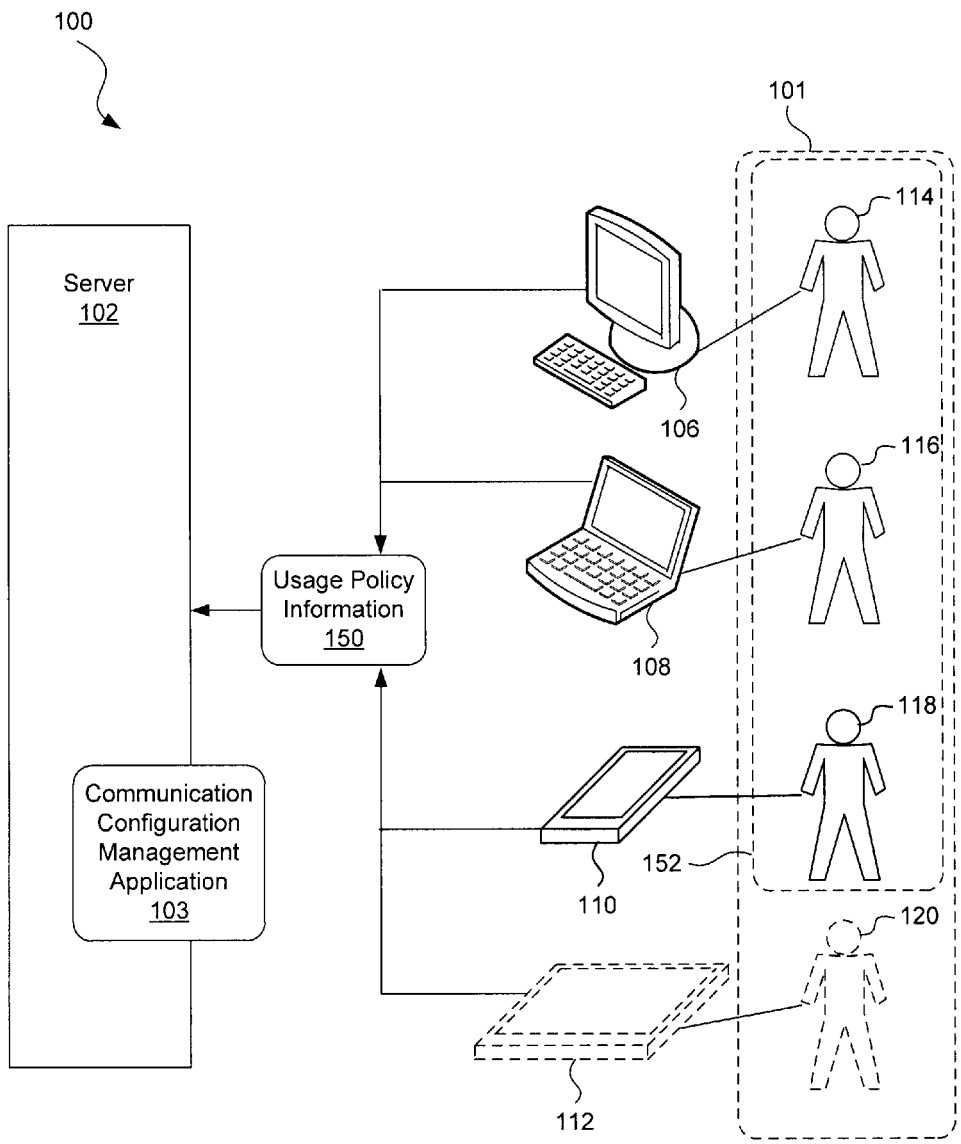
FIG. 1C is a diagram showing illustrative processes for group communication configuration, according to one example of principles described herein.

FIG. 1C is a diagram showing illustrative processes for group communication configuration. According to certain illustrative examples, data from the users 114, 116, 118, 120 may be collected according to a usage policy. The usage policy determines what data can be shared or collected in order to automatically provide the user with preferred configuration settings. The user may send usage policy information 150, which indicates what data may be collected from the user, to the configuration management application 103. The system may explicitly ask a user to opt in or opt out of different types of data to be shared and added to the collected usage information. The user may change the usage policy information at any time if the user changes his or her mind about what kinds of information can be shared. The server 102 may be updated on a regular basis by a background process of the user's device as to which of user's usage policy settings are in effect. In one example, the server 102 may enforce the usage policy. In some examples, the user's device may enforce the usage policy.

In one embodiment, a user may have an account with the system that provides the automatic communication configuration. The user may access this account through an application on a device or through a web portal. This may be the same web portal used to set up groups. The user may choose what type of information may be collected and what type of information may be shared. For example, if a user does not want his or her camera settings to be monitored, he or she may choose to prevent them from being monitored. In general, the more information a user is willing to share, the more the user can be provided with an adaptive experience. The user, however, may choose to balance the adaptive experience with increased privacy. If some device settings are off-limits according to the usage policy, then the logic that approximates the configuration settings may omit action regarding these settings as it configures a device.

FIG. 1C also illustrates an example where one member of the group 101 is not present for a communication session. In the present example, the fourth user 120 is not present for a communication session. This may be handled in a variety of ways.

In one example, there may be a separate group 152 that is treated differently than the original group 101. The separate group 152 includes only the first user 114, the second user 116, and the third user 118. Thus, the configuration information 130 sent to the three users 114, 116, 118 may be based off of the smaller group 152 preferences which may be similar but not necessarily identical to the preferences of the original group 101.

In one example, the system may still treat the group 101 as if each member was present. For example, the configuration information 130 may be sent to each user of the group 101 who is currently present (i.e., the smaller group 152). Thus, the configuration settings for those users 114, 116, 118 are assumed to be the same as they would be if the fourth user 120 were present. In other words, the system may not treat the online users of a group differently when one or more of the users are not present.

In some examples, reminders could be sent to all the users about the upcoming communication session. If a particular user does not join the session but decides to join at a later time, a mechanism could be provided to the particular user to allow joining the "group communication in session". At that time, the appropriate configuration may be provided to the late user.

Figure 2:
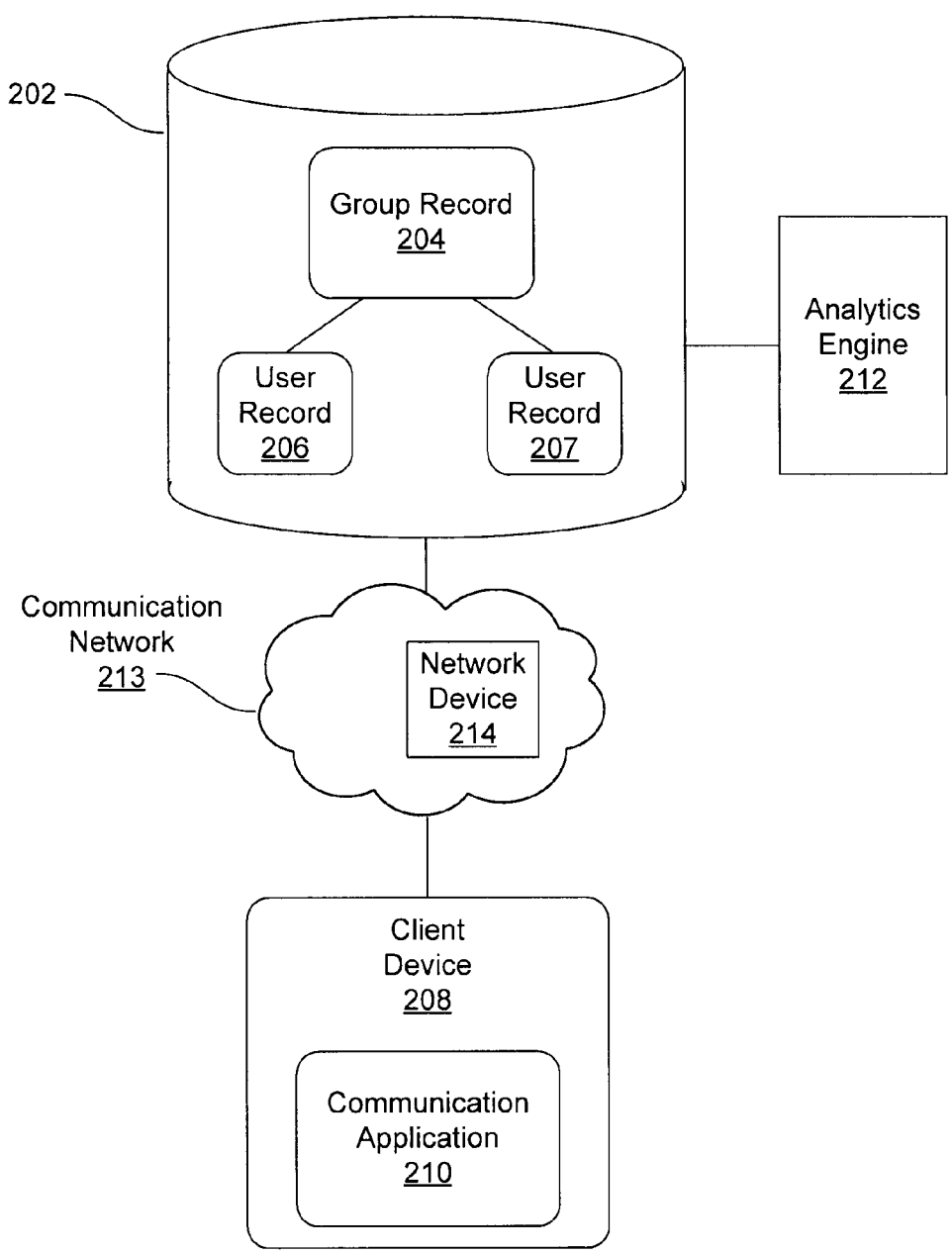
FIG. 2 is a diagram showing an illustrative process for collecting and analyzing group records, according to one example of principles described herein.

FIG. 2 is a diagram showing an illustrative process for collecting and analyzing group records. According to the present example, a data storage system 202 may maintain group records 204. The group records 204 may be associated with user records 206 for the users within the group represented by a group record 204. This information may be collected from various sources such as a network device 214 of a communication network or a communication application 210 on a client device 208. An analytics engine 212 may be used to analyze the collected data to provide a preferred communication configuration for each user within each group.

The data storage system 202 may include a number of data storage devices such as hard disks. The data storage system may include multiple disks that are physically located at different locations and connected through a network. Various records stored on the data storage system may be partially stored on one disk and partially stored on another disk.

In one embodiment, a group record 204 may be stored as an entry within a database. In some examples, the group records 204 may be stored as separate files rather than entries within a database. The group record 204 may be referenced based on the mechanisms used to store the group record 204. A group record 204 includes data about how users within the group communicate with each other. Thus, the group record 204 also includes references to the people who make up the group. The group record 204 also includes the types of devices associated with the users and the typical settings for those devices when communicating with the group.

A group record 204 is different than a user record 206, 207 in that it is referenced with respect to the group. For instance, a group record 204 may include a key/value pair in which the key is a group identifier (either a group number or group name) and the associated value may include identifiers for individual users as well as preferred communication settings and preferred devices for those users when communicating with the group and/or the like. When implemented as a file, the group record 204 may, for example, include metadata identifying a group. The metadata may identify the group by name or number. In some examples, a server may keep track of which device(s) each user uses, the communication applications each user uses on each device and the capabilities of each device/application in addition to the user's preferred configuration settings. Such data may be stored in associated with both individual records 206, 207 and group records 204.

By contrast, a user record 206, 207 may include information related to user settings for a variety of different situations and with a variety of different groups. For example, a particular user may use some settings for one group and use different settings for a different group. Group records may reference the user records 206, 207 of the users within a group by use of a pointer or other techniques. Also, there may be a separate group record for each group in the system. Thus, group records 204 are treated separately than user records 206, 207.

As described above, information related to user settings may be collected in a variety of ways. In one example, the communication application 210 on the client device collects the information and sends it to the appropriate location. In one example, a network device 214 (and other similar network devices not shown) on a communication network 213 collects the data.

The data collected may be maintained as various statistics related to specific users and groups. These statistics may include data related to different types of services used such as voice, video, chat, collaboration, file sharing and others. The statistics may also include data related to devices used, device capabilities available, and capabilities used. For example, a user might have a video camera available but may not use it for a given session. The statistics may also include data related to location as received from a global positioning system GPS or other mechanism derived from network access information. The statistics may also include data related to connection speed and other quality metrics for a given communication session. The statistics may also include data related to duration of communication sessions and time of day for those sessions. The statistics may also include data related to other various contexts as may be obtained from the data being transmitted.

The collected data may be processed by an analytics engine 212. The analytics engine 212 may sort through the collected data in order to determine which users regularly communicate with which other users in order to determine the groups themselves. This may be done, for example, by analyzing communication traffic over time and looking for patterns. Additionally, the analytics engine 212 can determine the preferred communication configuration settings used by the users when communicating with a specific group.

The preferred communication settings may be determined in a variety of ways. For example, the analytics engine may determine that for eight out of ten communication sessions with the group, user A turns his or her camera off while communicating with the group. Thus, because user A uses this setting a majority of the time when communicating with the group, it can be inferred that that is a preferred communication configuration. In some examples, there may be a threshold percentage other than 50% that is used to determine preferred communication configurations. For example, any setting that is used more than 60% of the time can be set as a preferred communication setting for a particular user with respect to a particular group. Other appropriate thresholds may be used in various embodiments.

In one example, the analytics engine 212 may associate metadata with the group records 204 and user records 206, 207. The metadata may package information in a manner that is efficient for a quick determination of configuration preferences. Thus, the configuration information to be sent to the user devices may be more easily obtained when needed. In other words, the metadata may summarize usage patterns used to determine preferred communication configurations. The metadata may be updated in real time or on a periodic basis.

Figure 3:
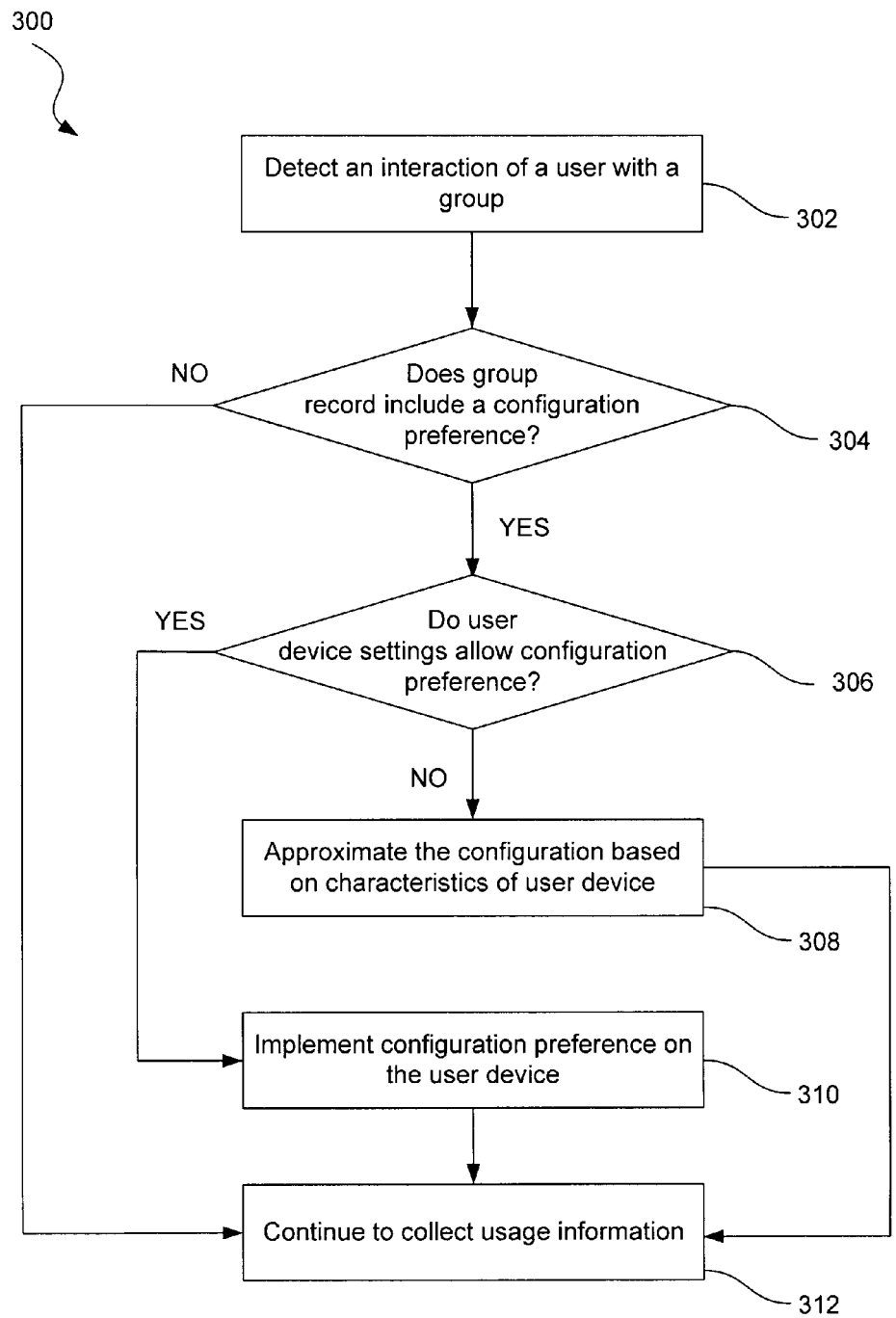
FIG. 3 is a flowchart showing an illustrative method for group communication configuration, according to one example of principles described herein.

FIG. 3 is a flowchart showing an illustrative method for group communication configuration. According to the present example, the method 300 starts with a step 302 for detecting an interaction of a user with a group. For example, if the communications of users within a group are being monitored, then it can be determined that the group is communicating. In one example, one or more of the users within a group may have a calendar event within their calendar applications that indicate a communication session is about to take place at a specific time.

The method 300 further includes a step 304 for determining if a group record associated with the group includes configuration preferences for any of the users within the group. If there are no configuration preferences for any user, then the method proceeds to step 312, where usage information is collection is continued.

If, however, the group record does include a configuration preference, then the method 300 proceeds to a step 306 for determining if the device being used by a user for the present communication session allows for the configuration preference of that user. If the device does allow the configuration preference, then the method proceeds to step 310 wherein the configuration preference is implemented on the user's device. From there, the method proceeds to step 312.

If, however, the user device does not allow for the configuration preference, then the method proceeds to step 308, wherein the configuration preference is approximated as described above, based on the current state of the user's device. From there, the method 300 proceeds to step 312.

Figure 4:
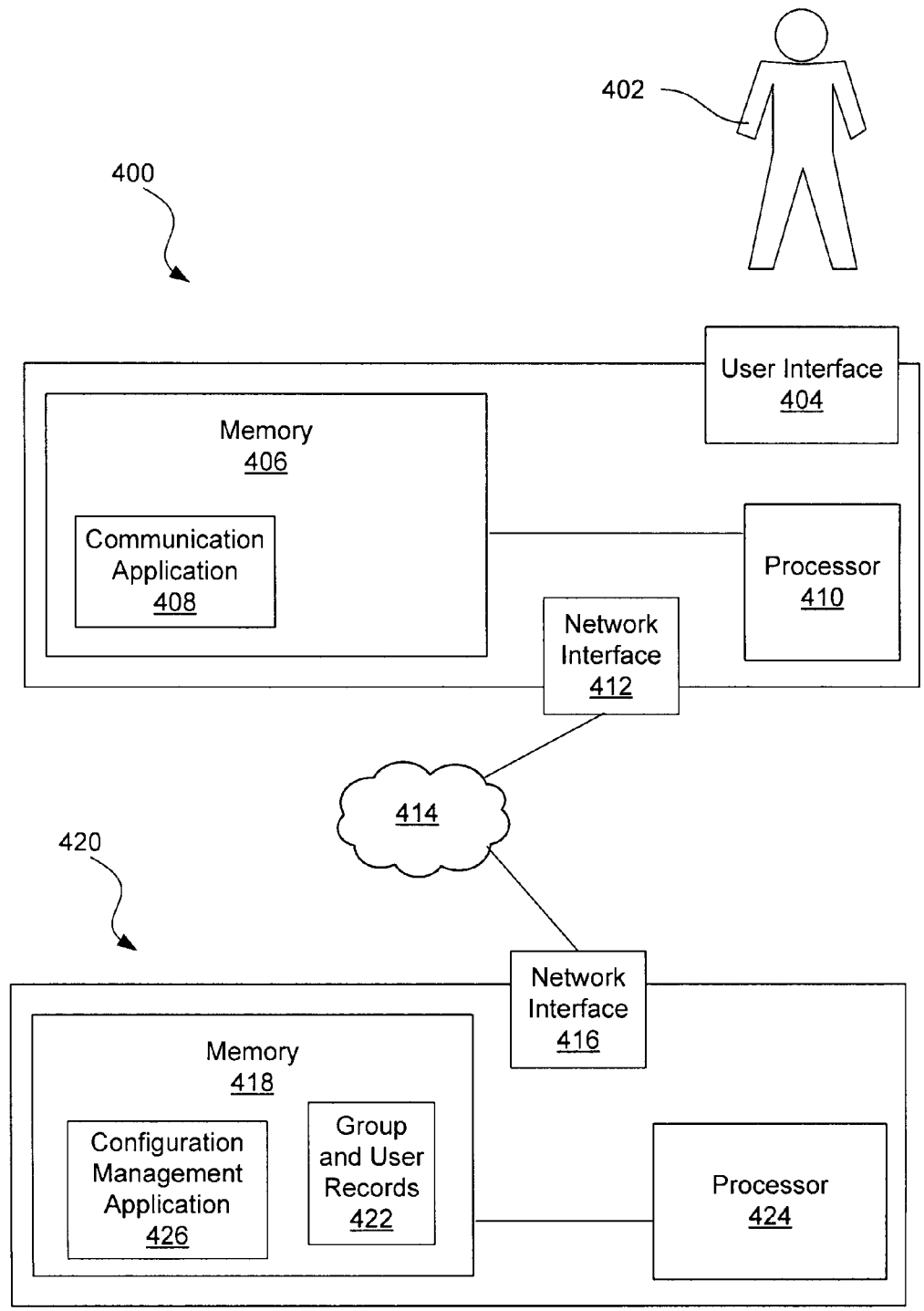
FIG. 4 is a diagram showing an illustrative client/server system, according to one example of principles described herein.

FIG. 4 is a diagram showing an illustrative client/server system. According to the present example, the client system 400 may include a user device such as a desktop computer, laptop computer, smartphone device, or tablet device. The server system 420 can also include any appropriate hardware such as a general purpose computer or other device. The server system 420 may facilitate communication between various client devices operated by different users within a group. The server system 420 may also maintain group and user records 422. Systems 400 and 420 may perform the actions of method 300 as described above and method 500 as will be described in further detail below.

According to certain illustrative examples, the client system 400 includes a memory 406 which may include software such as one or more communication application 408. The client system 400 also includes a processor 410, a network interface 412, and a user interface 404.

The memory 404 may be one of several different types of memory. Some types of memory, such as non-volatile types of memory, typically have large storage volume but relatively slow performance. Volatile memory, such as those used for Random Access Memory (RAM), are optimized for speed and are often referred to as "working memory." The server memory 418 may also include various types of memory such as volatile or non-volatile memory.

The client system 400 also includes a processor 410 for executing software and using or updating data stored in memory 404. The software may include an operating system and various other software applications. For example, the software may include several communication applications used to communicate with other users of a group.

The user interface 404 may include a number of input devices such as a mouse, touchpad, or touchscreen that allow the user 402 to interact with a GUI. The user interface 404 may also include a number of different types of output devices such as a monitor or a touchscreen. The user interface allows the user 402 to interact with the client system 400.

The network interface 412 may include hardware and software that allows the client system 400 to communicate with other devices over a network 414. The network interface 412 may be designed to communicate with the network 414 through hardwire media or wireless media as appropriate. Examples of networks for use in system 414 include the Internet, a LAN, a cellular network or any other appropriate network.

According to certain illustrative examples, the server system 420 includes a memory 418 and a processor 424. The memory may have stored thereon various group and user records 422. The server system 420 also includes a network interface 416 for communicating with other devices such as the client system 400.

The server 420 may include a configuration management application 426. The configuration management application 426 may be designed to communicate with the communication application 408 of the client system 406 to perform the functions described above. Additionally, the implementation of the features described above may be distributed between the server side application 426 and the client side application 408 in a variety of ways. For instance, the intelligence to approximate configurations for the devices may be performed by the server side application 426 or by the client side application 408, as appropriate for a particular embodiment.

Figure 5:
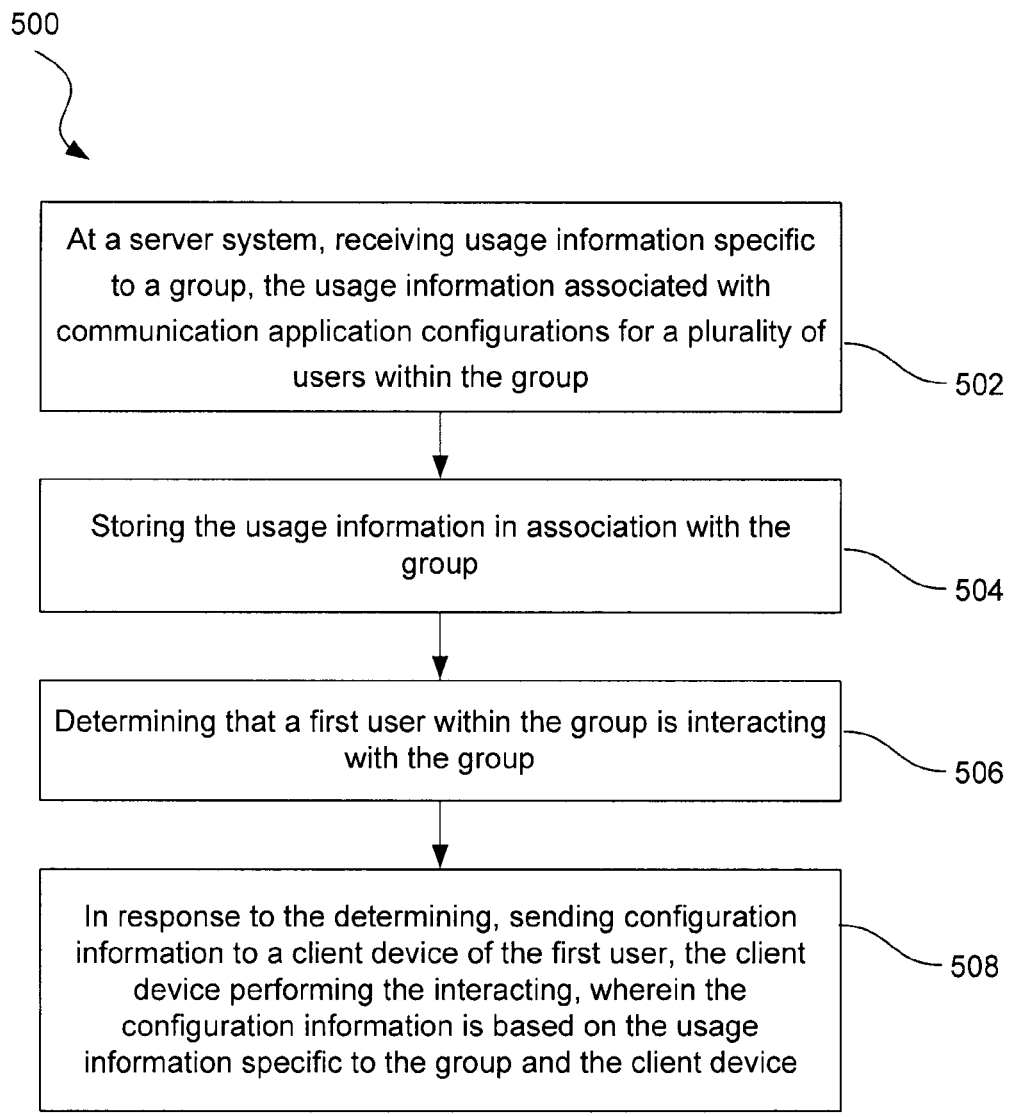
FIG. 5 is a flowchart showing an illustrative method for group communication configuration, according to one example of principles described herein.

FIG. 5 is a flowchart showing an illustrative method for group communication configuration. According to the present example, the method 500 includes a step 502 for, at a server system, receiving usage information specific to a group, the usage information associated with communication application configurations for a plurality of users within the group. The method 500 further includes a step 504 for storing the usage information in association with the group. The method 500 further includes a step 506 for determining that a first user within the group is interacting with the group. The method 500 further includes a step 508 for, in response to the determining, sending configuration information to a client device of the first user, the client device performing the interacting, wherein the configuration information is based on the usage information specific to the group and the client device.

Figure 6:
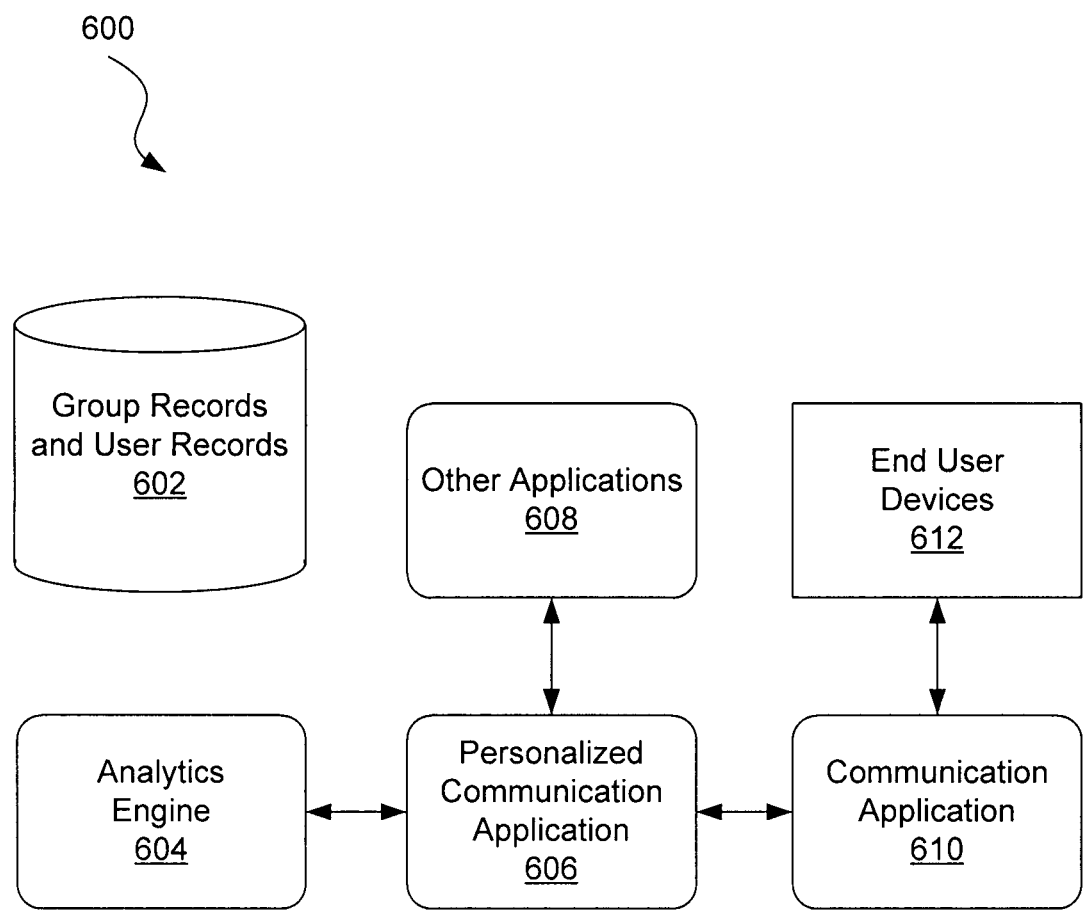
FIG. 6 is a diagram showing illustrative components of a group communication system, according to one example of principles described herein.

FIG. 6 is a simplified block diagram showing illustrative components of a group communication system 600 focusing on software architecture. As described above, subject to acceptable use policy, data is captured across a network. This data identifies groups of end users who regularly communicate with each other as well as how they use specific communications services and devices. The capture of data includes such data as modes of communication used (e.g. conference call, collaboration, chat, file sharing, etc.), devices regularly used by each end user for each mode, location of individual users and modes used at a location, and other information about a communications session or its context and location.

This data is captured to create end user records and group records 602. Each user is given the option to opt in/out for the collection of some or all of the above data items as described above. The system 600 will attempt to infer missing data, such as location data, for users who are "off-net" or outside the realm of the network or outside the realm of associated applications making up the system. The captured data may be analyzed and sorted by the analytics engine 604.

Personalized communication application 606 may be an application run by a server such as server 420 of FIG. 4. When a group communication event is triggered, the personalized communication application 606 is invoked. For example, a calendar application may send a notification when a reminder is sent for an upcoming group staff call. Application 606 is also able to automatically identify a group communication event by correlating the establishment of new communications sessions to a previous one in real time. In other words, if a group regularly meets Tuesdays at 3:00 PM, then the application 606 can infer that they will meet again on the upcoming Tuesday at 3:00 PM.

The personalized communication application 606 queries the analytics engine 604 to identify the most frequently used communications profile for the identified group. The profile may be associated with the group record for the identified group. The analytics engine 604 determines the best match by correlating the information available about a new communications session as it is being set up. The analytics engine 604 will consider user entered opt in/out data when making its determination. In some examples, the analytics engine 604 is run on a server. Though, in other examples, responsibilities of analytics engine 604 may be distributed among a server and one or more user devices.

The personalized communication application 606 may obtain information from other applications 608 (through an application programming interface (API)). For example, a user may have a calendar application that is not directly related to communication services. Such an application can provide data that is relevant to a user's preferred communication settings. Thus, application 608 may be run on the network or at one of the user devices 612.

The communication application 610 may run on client devices 212. The communication application may be any kind of application that provides a communication service such as an email client or an instant messaging application. The communication application may also perform some of the analytics function in cooperation with or on behalf of the analytics engine 604.

Also, data records that have missing information (e.g., a user who is "off-net") may, in some embodiments, have the missing information weighted neutrally so as not to improperly bias the correlation/match determinations made by the analytics engine 604. Stored information about each individual user's previous communications session with the group as well as a given end-user's previous interactions with similar services is used by the analytics engine 204 to determine the best services to use the preferred communication settings for those services, as well as the optimal way to present them to each end-user on his or her device 612.

Using the results of the analytics process described above, the preferred communication applications are invoked and communication is established with each end user based on the learned preferences. Each user is presented with an optimal user interface for the new session.

Some examples of processing systems described herein may include non-transient, tangible, machine readable media that include executable code that when run by one or more processors (e.g., processor 410, 424) may cause the one or more processors to perform the processes of methods 300 and 500 as described above. Some common forms of machine readable media that may include the processes of methods 500 and 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. Devices described herein in the various FIGS., such as servers, user devices, and the like may include computer processors that access executable code and execute that code to perform the actions described above. Various embodiments may include a computer program product having a computer readable medium tangibly recording computer program logic to perform the actions described above.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
generating, by a computing system, configuration information for configuring a communication application, the configuration information based at least in part on usage information associated with communication application configurations specific to a group comprising a plurality of users, wherein generating the configuration information includes maintaining a group communication record for the group, the group communication record comprising a record of past communications between the plurality of users of the group, the group communication record being associated with a set of user communication records for each user of the plurality of users, the user communication records associated with communication application settings of users when interacting with the group, the group communication record being specific to the group and being different from the set of user communication records;
determining that a first user within the group is using the communication application for communicating via a client device with at least one other user in the group; and
responsive to the determining, sending the configuration information to the client device.

2. The method of claim 1, wherein the configuration information instructs the communication application on the client device to configure a user interface of the communication application for the interaction with the group.

3. The method of claim 1, further comprising, updating the usage information associated with the group after the communicating.

4. The method of claim 1, further comprising, receiving usage policy information from a second user within the group, the usage policy information specifying types of information that can be included in the usage information.

5. The method of claim 1, wherein the configuration information includes a first preference configuration and a second preference configuration for a user interface of the communication application of the client device.

6. The method of claim 5, further comprising:
determining that the client device is not able to use the first preference configuration; and
instructing the communication application to use the second preference configuration.

7. The method of claim 1, wherein the usage information includes at least one of:
types of devices used, capabilities of devices used, location information, time of day, network connection speed information, and duration of previous interactions for each of the plurality of users within the group.

8. The method of claim 1, wherein the communication application on the client device provides at least one of: voice over internet protocol (VoIP) services, instant messaging services, audio and video conferencing services, web collaboration services, messaging services, file sharing services, and calendar services.

9. The method of claim 1, wherein the configuration information defines at least one of: camera settings, microphone settings, display settings, and volume settings.

10. The method of claim 1, wherein the configuration information instructs the communication application on the client device to configure settings for communication related hardware states of the client device and a user interface of a communication application of the client device.

11. A computing system comprising:
a processor; and
a memory comprising machine readable instructions that when executed by the processor, cause the system to:
maintain group communication records for a group including a plurality of users, the group communication records comprising a record of past communications between the plurality of users of the group;
maintain user communication records for each of the plurality of users;
analyze the group communication records and the user communication records to generate preferred communication application configurations for each of the plurality of users, the group communication records being associated with the user communication records for the plurality of users, the user communication records associated with communication application settings of users when interacting with the group, the group communication records being specific to the group and being different from the user communication records;
determine that an interaction between the plurality of users within the group is to occur; and
instruct communication applications on client devices of the plurality of users within the group to adopt the preferred communication application configurations for the plurality of users.

12. The computing system of claim 11, wherein the machine readable instructions further cause the system to update the group communication records and the user communication records after the interaction based on user actions during the interaction.

13. The computing system of claim 11, wherein the preferred communication application configuration is specific to a type of device.

14. The computing system of claim 11, wherein a first client device approximates a preferred communication application configuration received from the system based on characteristics of the client device being different from characteristics assumed by the preferred communication application configuration.

15. The computing system of claim 11, wherein a preferred communication application configuration for a specific user of the plurality of users is based on historical settings used by the specific user for previous interactions with the group.

16. The computing system of claim 11, wherein an amount and a type of usage information associated with the user communication records varies for each of the plurality of users within the group.

17. The computing system of claim 11, wherein the system further comprises an analytics engine to determine respective preferred communication application configurations for each user within the group for interactions with the group.

18. The computing system of claim 11, wherein one of the preferred communication application configurations instructs a given communication application on a given client device to configure settings for communication related hardware states of the given client device and a user interface of a given communication application of the given client device.

19. A method for group collaboration communication configuration, the method comprising:
with a server system, receiving usage information associated with interactions of a group;
maintaining a group communication record for the group, the group communication record comprising a record of past communications between users of the group, the group communication record being associated with a set of user communication records for each user within the group, the user communication records associated with communication application settings of users when interacting with the group, the group communication record being specific to the group and being different from the set of user communication records;
in real time, determining that a new interaction of the group is to occur;
detecting a client device used by a first user of the group for the new interaction; and
configuring settings of the client device based on the user communication records for the first user, the settings based on a best match based on historical user settings for interactions of the group stored in the user communications records for the first user.

20. The method of claim 19, wherein the settings are for communication related hardware states of the client device and user interface configurations of a communication application of the client device.

* * * * *